United States Patent
Ruchet (10) Patent No.: US 8,554,023 B2
(45) Date of Patent: Oct. 8, 2013

(54) UNBALANCED MACH-ZEHNDER INTERFEROMETER AND MODULATOR BASED THEREUPON

(75) Inventor: Bernard Ruchet, Quebec (CA)

(73) Assignee: Exfo Inc., Quebec (QC) (CA)

( * ) Notice: Subject to any disclaimer, the term of this patent is extended or adjusted under 35 U.S.C. 154(b) by 93 days.

(21) Appl. No.: 13/222,348

(22) Filed: Aug. 31, 2011

(65) Prior Publication Data
US 2012/0189238 A1 Jul. 26, 2012

Related U.S. Application Data

(60) Provisional application No. 61/436,444, filed on Jan. 26, 2011.

(51) Int. Cl.
*G02F 1/01* (2006.01)
(52) U.S. Cl.
USPC ............................... 385/1; 398/188
(58) Field of Classification Search
CPC ....................................... G02F 1/025
USPC ............................. 385/1; 398/188
See application file for complete search history.

(56) References Cited

U.S. PATENT DOCUMENTS

| | | | | |
|---|---|---|---|---|
| 5,119,383 A | * | 6/1992 | Duling et al. | ..... 372/18 |
| 5,974,206 A | * | 10/1999 | Bricheno et al. | ..... 385/11 |
| 7,414,728 B2 | | 8/2008 | Caplan | |
| 7,534,990 B2 | | 5/2009 | Yao | |
| 7,539,422 B2 | | 5/2009 | Tomaru | |
| 7,869,719 B2 | | 1/2011 | Hoshida et al. | |
| 2010/0067923 A1 | * | 3/2010 | Arahira | ..... 398/188 |
| 2011/0063728 A1 | | 3/2011 | Cai et al. | |
| 2011/0090567 A1 | | 4/2011 | Tischhauser et al. | |

OTHER PUBLICATIONS

Chung et al. ("A fiber Bragg grating sensor demodulation technique using a polarization maintaining fiber loop mirror," Photonics Technology Letters, IEEE, 2001, p. 1343; "Chung").*
Xiao et al., "Faraday-Michelson system for quantum crytography", Optics Letters, vol. 30, No. 19, pp. 2632-2634, Oct. 2005.
Yao and Wang, "Photonic Microwave Bandpass Filter With Negative Coefficients Using a Polarization Modulator", IEEE Photononics Techology Letters, vol. 19, No. 9, pp. 644-646, May 2007.
Kotaki and Soda, "Time-resolved chirp measurement of modulator-integrated DFB LD by using a fiber interferometer", in Proceedings of Optical Fiber Conference 1995, FC4, pp. 310-311, 1995.
Kerbage and Eggleton, "Numerical analysis and experimental design of tunable birefringence in microstructured optical fiber", Optics Express, vol. 10, No. 5, pp. 246-255, 2002.

* cited by examiner

*Primary Examiner* — Charlie Peng
*Assistant Examiner* — Peter Radkowski (57) ABSTRACT

There are provided an unbalanced Mach-Zehnder interferometer and a modulator based thereupon. The interferometer comprises a loop comprising a plurality of cascaded segments of polarization-maintaining fibers, into which an input signal is split such that two light portions of the split signal propagate concurrently in mutually opposite directions along the loop; and a first optical arrangement between a first and a second segment of the loop for rearranging the axes of propagation of the two light portions such that, on at least a one segment, the two light portions propagate along mutually orthogonal polarization axes of the polarization-maintaining fiber. The light portions are then recombined to mutually interfere. Birefringence of the segment(s) where the light portions propagate on mutually orthogonal polarization axes then provides a differential path length of the interferometer. An unbalanced Mach-Zehnder modulator is obtained by inserting a phase modulator within the loop.

13 Claims, 5 Drawing Sheets

UNBALANCED MACH-ZEHNDER INTERFEROMETER AND MODULATOR BASED THEREUPON

CROSS-REFERENCE TO RELATED APPLICATIONS

This application claims priority under 35 USC §119(e) of U.S. provisional patent application(s) 61/436,444 filed Jan. 26, 2011, the specification of which is hereby incorporated by reference.

TECHNICAL FIELD

The invention relates to Mach-Zehnder optical interferometers and optical modulators based thereupon.

BACKGROUND OF THE ART

Mach-Zehnder interferometers are commonly used in various applications including optical telecommunication applications. Mach-Zehnder interferometers are optical filters, which may be employed in optical-signal analysis systems, optical-communication link-characterization systems or in transceiver devices, for example. Mach-Zehnder interferometers, in combination with phase modulators, are also used at the basis of Mach-Zehnder modulators. Other possible uses include Differential Phase Shift Keying (DPSK) receivers, power combiners, interleavers, optical switches, etc., which find applications in Code Division Multiple Access (CDMA) communications, secure communications and Optical Coherence Tomography (OCT), for example.

A Mach-Zehnder interferometer is an interferometer for which input light is split onto two distinct light paths having different path lengths and then recombined to interfere. The path-length difference may be fixed or varied using, for example, a phase modulator to provide a Mach-Zehnder modulator. When a Mach-Zehnder modulator device comprises both a fixed delay (i.e. much greater than the wavelength $\lambda$ of the input light under normal operation) and variable delay (i.e. of the order of $\lambda$), the device is often termed as an "unbalanced Mach-Zehnder modulator". The few commercial vendors that offer unbalanced Mach-Zehnder modulators based on integrated optics generally offer only a particular value for the path-length difference, which often does not correspond to the value needed by the user. There is no practical way to change this value once manufactured. The fabrication of an integrated-optic Mach-Zehnder modulator having a custom path-length difference value is an expensive process, involving the fabrication of a custom mask, and hence, when manufactured in small quantities, leads to very high unit costs.

It could be envisaged that the Mach-Zehnder interferometers be fabricated using optical fiber rather than integrated-optic waveguides for the path lengths, wherein the optical fiber could be polarization-maintaining in order to minimize deleterious effects arising from acoustic and mechanical perturbations. However, it is generally impractical to construct interferometers having path differences of the order of a few millimeters or less, since it is almost impossible to reliably and precisely splice (or otherwise mate) fiber lengths having such small controlled length differences. A variable or adjustable optical delay line could be employed to achieve a particular desired path length difference, but such a device is generally expensive and bulky, and hence is often unacceptable. Generally speaking, an interferometer constructed with two optical fibers may be unduly sensitive to temperature changes because a differential temperature change on the two macroscopically large (generally >20 cm) distinct optical-fiber paths changes the effective path-length difference.

SUMMARY

There is therefore a need for Mach-Zehnder interferometers and modulators having a practically configurable path-length difference that are not unduly susceptible to environmental perturbations.

Such an interferometer or modulator is obtained using a loop comprising a plurality of segments of Polarization-Maintaining Fiber (PMF), into which an input signal is split. Two portions of the split light signal then propagate concurrently in opposite directions in the loop of PMF segments, such that the two signal portions propagate mutually oppositely on respective mutually orthogonal polarization axes on at least one of the segments comprised in the loop. The opposite directions of propagation provide two optical paths having different respective optical path lengths, the path-length difference being determined by the birefringence of the PMF segment or segments where the signal propagates on mutually orthogonal polarization axes.

In such an interferometer or modulator, it is relatively easy to generate even small effective Mach-Zehnder optical path-length differences (e.g. of the order of 10 µm, or less) by exploiting the fiber birefringence. For example, if the PMF segments are made of a typical commercial PMF (e.g. PANDA™ fiber from Fujikura) having a typical relative difference in birefringence between the slow and fast axes of approximately $10^{-3}$, there results a factor of about $10^3$ for the physical length of optical fiber corresponding to the effective optical-path-length difference. Accordingly, the splicing tolerance is relaxed by this same factor.

Also, the two light paths comprised within the interferometer correspond to propagation along the respective slow and fast axes of the same PMF, and hence the two optical-path lengths are "common mode", i.e. affected in substantially the same manner by varying environmental conditions such as temperature variations and vibration, which lends this configuration a reduced sensitivity to such perturbations.

In accordance with one aspect, the loop of cascaded PMF segments comprises a first segment, a second segment of PMF and a non-reciprocal polarization-transforming arrangement (i.e. an optical arrangement having an asymmetric response in polarization with respect to the propagation direction, such as a Faraday rotator) between the first and the second segment such that counter-propagating signals propagate concurrently on mutually orthogonal polarization axes on the first segment of the loop and on a same polarization axis on the second segment of the loop.

This configuration may be used to introduce a phase modulator in the loop and provide an unbalanced Mach-Zehnder modulator.

Commercially available phase modulators are generally polarization-dependent. Polarization-dependent phase modulators may generally be split into two categories, i.e. polarization-selective phase modulators for which modulation is only efficiently applied to one State Of Polarization (SOP) of the guided light whereas light guided on the orthogonal SOP is transmitted but with significantly less or no substantial modulation; and polarizing phase modulators for which signal along the orthogonal SOP is effectively extinguished or subject to significant insertion loss. Polarization-independent phase modulators also exist, for which modulation is applied along both SOPs, but they are usually more complex and less efficient devices in terms of the voltage-tophase ratio, and hence generally lead to more expensive designs. Both polarization-dependent and polarization-independent modulators may or may not be directionally symmetric.

By introducing the phase modulator along the second segment of polarization-maintaining optical fiber (where the counter-propagating signals propagate on the same polarization axis), it makes it possible to employ a polarization-dependent phase modulator.

There are provided an unbalanced Mach-Zehnder interferometer and a modulator based thereupon. The interferometer comprises a loop comprising a plurality of cascaded segments of polarization-maintaining fibers, into which an input signal is split such that two light portions of the split signal propagate concurrently in mutually opposite directions along the loop; and a first optical arrangement between a first and a second segment of the loop for rearranging the axes of propagation of the two light portions such that, on at least a one segment, the two light portions propagate along mutually orthogonal polarization axes of the polarization-maintaining fiber. The light portions are then recombined to mutually interfere. Birefringence of the segment(s) where the light portions propagate on mutually orthogonal polarization axes then provides a differential path length of the interferometer. An unbalanced Mach-Zehnder modulator is obtained by inserting a phase modulator within the loop.

In accordance with one aspect, there is provided a method for effecting self-interference of an optical signal. The method comprises: splitting the optical signal into a first and a second light portion; coupling first and second light portions to a loop comprising a plurality of segments of PMF such that first and second light portions propagate concurrently in respective mutually opposite directions in the loop; oppositely propagating first and second light portions along mutually orthogonal polarization axes on at least a first of the segments of PMF of the loop, such that birefringence of the at least a first of the segments where the light portions propagate on mutually orthogonal polarization axes provides a differential path length; and interfering together the propagated light portions to provide a Mach-Zehnder interferometer having said differential path length.

First and second light portions may be phase modulated on the loop to provide a Mach-Zehnder modulator having said differential path length.

In one embodiment of the method, on a second PMF segment of the loop, first and second light portions counter-propagate along a same polarization axis.

First and second light portions may be phase modulated along the second PMF segment of the loop to provide a Mach-Zehnder modulator having said differential path length.

In accordance with another aspect, there is provided a Mach-Zehnder interferometer comprising: an optical splitter/combiner for receiving an input optical signal on an input port of the optical splitter/combiner and splitting the optical signal into a first and a second light portions on respective first and second ports of the optical splitter/combiner and recombining, on an output port of the optical splitter/combiner, first and second light portions returning to the optical splitter/combiner on first and second ports to mutually interfere; a loop comprising at least a first and a second cascaded segments of PMFs in the optical path between first and second ports of the optical splitter/combiner such that first and second light portions propagate concurrently in respective mutually opposite directions in the loop; and a first optical arrangement between the first segment and the second segment of the loop for rearranging the axes of propagation of first and second light portions such that, on at least the first segment, first and second light portions propagate along mutually orthogonal polarization axes of the PMF, whereby birefringence of the at least the first segment where the light portions propagate on mutually orthogonal polarization axes provides a differential path length of the interferometer.

The first optical arrangement may be a first non-reciprocal polarization-transforming arrangement and the interferometer may further comprise a second non-reciprocal polarization-transforming arrangement disposed along the loop such that, on the second segment, first and second light portions propagate along a same polarization axis of the PMF.

The interferometer may further comprise a phase modulator on at least one of the segments for modulating first and second light portions such that the interferometer provides a Mach-Zehnder modulator having said differential path length.

The interferometer may comprise at least one phase modulator on the second segment of the loop, where first and second light portions propagate along a same polarization axis, for modulating first and second light portions such that the interferometer provides a Mach-Zehnder modulator having said differential path length. In this case, the phase modulator may be a polarization-dependent phase modulator.

In accordance with yet another aspect, there is provided a method for effecting self-interference of an optical signal in a Mach-Zehnder interferometer. The method comprises: splitting the optical signal into a first and a second light portion, using an optical splitter/combiner; coupling first and second light portions to a fiber-optic loop comprising at least a first and a second cascaded segments of PMF such that first and second light portions propagate concurrently in mutually opposite directions in the loop; rearranging the axes of propagation of first and second light portions between the first segment and the second segment of PMF of the loop using a first optical arrangement such that first and second light portions propagate along respective mutually orthogonal polarization axes on at least the first segment, whereby birefringence of the at least the first segment, within which the light portions propagate on mutually orthogonal polarization axes, provides a differential path length; and interfering together the propagated light portions using the optical splitter/combiner to provide a Mach-Zehnder interferometer having said differential path length.

Throughout this specification, the term "Polarization-Maintaining Fiber (PMF)" is intended to mean a birefringent optical fiber in which the Principal States of Polarization (PSPs) are negligibly coupled along the fiber and are substantially wavelength independent. Such fibers guide light polarized along either one of the PSPs. The term "PMF" is meant to encompass typical commercial fibers, such as PANDA™ fibers, BOW-TIE™ fibers and elliptical-clad fibers, and also encompasses any other birefringent optical fiber having the behavior described above. Such fiber will be referred to hereinafter as PMF.

BRIEF DESCRIPTION OF THE DRAWINGS

It will be noted that throughout the appended drawings, like features are identified by like reference numerals.

DETAILED DESCRIPTION

Figure 1A:
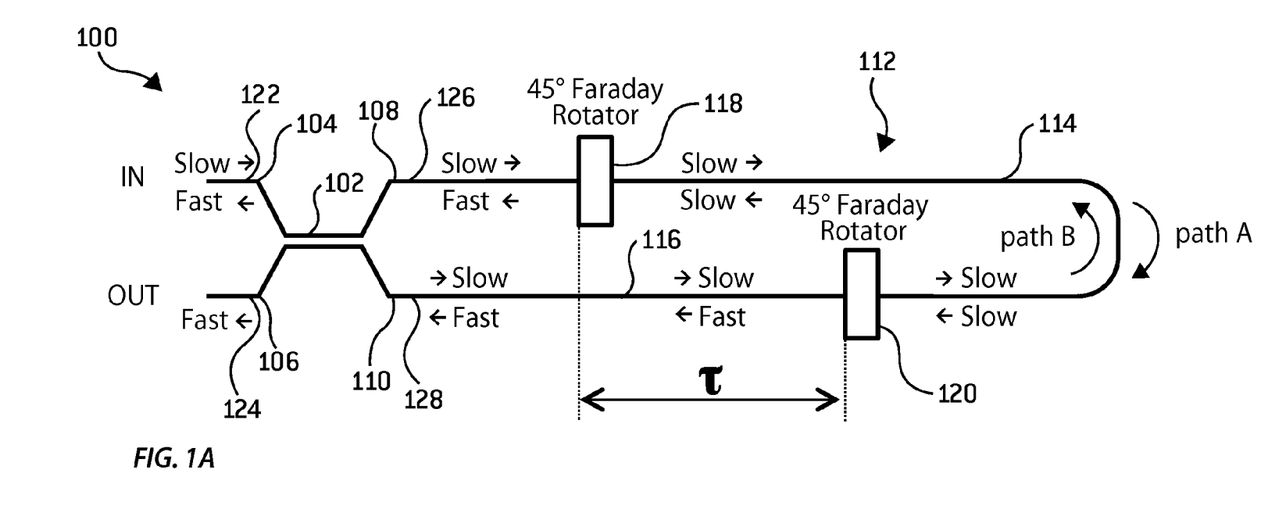
FIG. 1A is a schematic illustrating a Mach-Zehnder interferometer in accordance with one embodiment.

Now referring to the drawings, FIG. 1A illustrates a Mach-Zehnder interferometer 100 in accordance with one embodiment. The interferometer 100 comprises an optical splitter/combiner 102, a fiber coupler in this case, having a first and a second port 104, 106 on one side thereof, and a third and a fourth port 108, 110 on the other side thereof. It should be appreciated that the optical splitter/combiner 102 may also be made from any other type of coupler such as bulk optic beam splitters for example. A loop 112 comprising two cascaded segments 114, 116 of PMF, is connected between third and fourth ports 108, 110 of the optical splitter/combiner 102. Non-reciprocal (i.e. asymmetric with respect to the propagation direction) polarization-transforming arrangements 118, 120 are disposed along the loop 112 of PMF segments 114, 116. Non-reciprocal polarization-transforming arrangement 118 is located between port 108 and PMF segment 114 and non-reciprocal polarization-transforming arrangement 120, between PMF segments 114 and 116.

An optical signal received on port 104 of the optical splitter/combiner 102 is split into two light portions on ports 108 and 110 such that the two light portions propagate in mutually opposite directions within the loop 112 of PMF segments 114, 116, thereby defining two optical paths, i.e. path A from port 108 to 110 and path B from port 110 to 108.

The optical splitter/combiner 102 is a symmetric 50/50 polarization-maintaining coupler comprising four PMF pigtails 122, 124, 126, 128 that are optically linked to respective ports 104, 106, 108, 110. Accordingly, light received on one polarization axis at one port, i.e. port 104, is split into two substantially equal light portions on ports 108 and 110, where each portion is aligned along the same (i.e. "slow" or "fast") polarization axis. It should be appreciated that coupling ratios other then 50/50 may be used as well but with reduced interference efficiency and increased loss.

The non-reciprocal polarization-transforming arrangement 118 is an optical arrangement designed to couple two PMFs, i.e. PMF 126 to PMF 114, in a non-reciprocal manner. That is, light aligned with and propagating along one polarization axis (i.e. "slow" axis for the embodiment of FIG. 1A) of PMF 126 is substantially fully coupled to the same polarization axis (i.e. "slow" axis) of PMF 114, whereas light aligned with the same one polarization axis (i.e. "slow" axis) in PMF 114 but propagating in the opposite direction, i.e. from PMF 114 to PMF 126, is coupled to its orthogonal polarization axis (i.e. "fast" axis) on PMF 126. The non-reciprocal polarization-transforming arrangement 120 similarly connects PMF 116 to PMF 114. In this embodiment, such non-reciprocal polarization-transforming arrangements 118, 120 may be obtained by inserting a 45° Faraday rotator between two PMFs mutually aligned at 45°. It should be appreciated that other Faraday rotators also may be employed in this embodiment, notably any rotator which induces rotation at half odd-integral multiples of 90°, such as 135° and 225° Faraday rotators.

The manner by which the Mach-Zehnder interferometer of this embodiment is operable to induce self-interference of the input optical signal will now be further described. A polarized input optical signal is received on port 104. In the illustrated embodiment, the input optical signal is received as polarized along the slow axis. The optical signal is split by the optical splitter/combiner 102 into approximately equal first and second light portions aligned along the respective slow axes on ports 108 and 110. The two light portions propagate concurrently in mutually opposite directions along the loop 112 of PMFs, thereby defining two optical paths, denoted path A and path B. Along path A, light enters loop 112 on the slow axis of PMF pigtail 126. Light then couples to and propagates along the slow axis of PMF 114, and then couples to and propagates along the fast axis of PMF 116. Light then returns to the optical splitter/combiner 102 on the fast axis of PMF pigtail 128, which is spliced or otherwise mated with PMF 116 in such a manner that their respective birefringence axes are aligned. Along path B, light enters loop 112 on the slow axis of PMF pigtail 128. Light then couples to and propagates along the slow axis of PMF 116, and then couples to and propagates along the slow axis of PMF 114. Light is then coupled to the fast axis of PMF pigtail 126 to return to the optical splitter/combiner 102. The two light portions having propagated along paths A and B, respectively, are then recombined to interfere by the optical splitter/combiner 102, and this interferometric signal is output on the fast axis on port 106.

Accordingly, on path A and path B, the respective light portions propagate along the same polarization axis, i.e. the slow axis, in PMF segment 114, while the light portions propagates along mutually orthogonal polarization axes, i.e. fast axis along path A and slow axis along path B, in PMF segment 116. Consequently, the birefringence of PMF segment 116 defines an effective optical-path-length difference between path A and B which provides the Mach-Zehnder differential path length τ. The differential path length τ is thereby defined as the product of the birefringence of PMF segment 116 and the length $\Delta L$:

$$\tau = \Delta L \times B \tag{1}$$

where $\Delta L$ is the length and B the birefringence of PMF segment 116. More precisely, the differential path length τ is defined by the birefringence B over the optical fiber length difference $\Delta L$ from the optical splitter/combiner 102 to Faraday rotators 118 and 120 on respective optical paths A and B. It is noted that the above equation assumes an equal birefringence value and an equal length of PMF pigtails 126 and 128. In this case, the differential path length τ is determined only by the birefringence B of PMF segment 116.

More generally, the birefringence and length of all segments of fiber where light portions counter-propagate on mutually orthogonal polarization axes should be taken into account in determining the differential path length τ. Accordingly, in the configuration of FIG. 1A, $$\tau = L_{128} \times B_{128} + L_{116} \times B_{116} - L_{126} \times B_{126} \tag{2}$$

where $L_{128}$, $L_{116}$, and $L_{126}$ are respectively the length of PMF pigtail 128, PMF segment 116 and PMF pigtail 126 and $B_{128}$, $B_{116}$, and $B_{126}$ are the respective birefringences of PMF pigtail 128, PMF segment 116 and PMF pigtail 126. Equation (2) may of course be generalized to cases employing any number n of PMF segments.

The two optical paths, i.e. path A and path B, correspond to propagation in opposite directions along a loop of a plurality of segments of optical fibers and thus share the same segments of optical fibers. Consequently, the optical-path lengths of paths A and B are affected in substantially the same manner by environmental perturbations such as temperature variations and vibrations. This configuration is thus rendered significantly insensitive to such varying environmental conditions.

It should be noted that variations may be made to the embodiment of FIG. 1A. For example, the polarization axis of the input optical signal may be changed such that the input optical signal is aligned with and propagates along the fast polarization axis of the input PMF 122. In this case, along path A, one light portion propagates on the fast polarization axis of PMFs 126 and 114, and on the slow polarization axis of PMFs 116 and 128, whereas, along path B, the other light portion propagates on the fast polarization axis of PMFs 126 and 116, and on the slow polarization axis of PMFs 114 and 126. Furthermore, as will be further discussed hereinafter, the Mach-Zehnder interferometer may also be used at the same time on both polarization axes.

In one embodiment, PMF segments 114 and 116 are made of PANDA™-type optical fiber but it is noted that any other type of polarization-maintaining optical fiber, such as BOW-TIE™-type fiber and elliptical-clad fiber, may be used as well.

It should also be appreciated that light coupling between two segments of optical fiber, between optical components or between an optical fiber and an optical component may be achieved, for example, by fusion splicing optical fibers, by connecting optical fibers using fiber-optic connectors, by free space coupling of an optical fiber to a bulk-optic component or by otherwise mating optical components and/or optical fibers together such that light propagating in one is coupled to the other.

One skilled in the art will understand that other variations are of course possible.

Figure 1B:
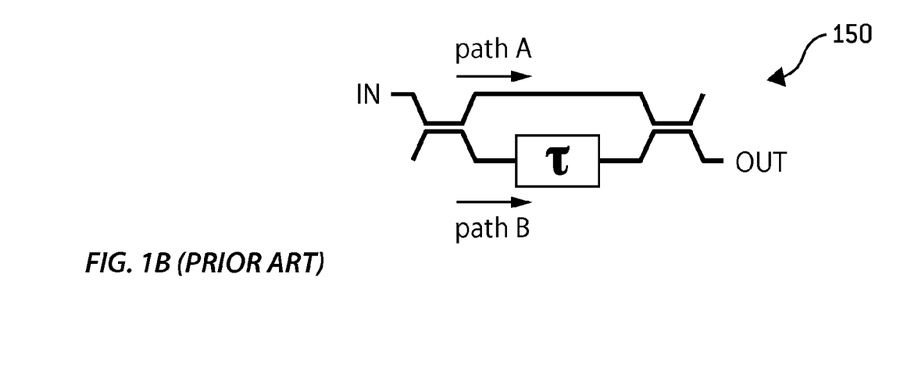
FIG. 1B is a schematic illustrating the equivalent of the configuration of FIG. 1A in a conventional two-arm Mach-Zehnder interferometer.

Referring to FIG. 1B, it is noted that the interferometer of FIG. 1A is functionally equivalent to a conventional polarization-maintaining two-arm Mach-Zehnder interferometer 150, wherein an input optical signal is split among two physically distinct optical paths, i.e. path A and path B, having a differential path length $\tau$.

Figure 2:
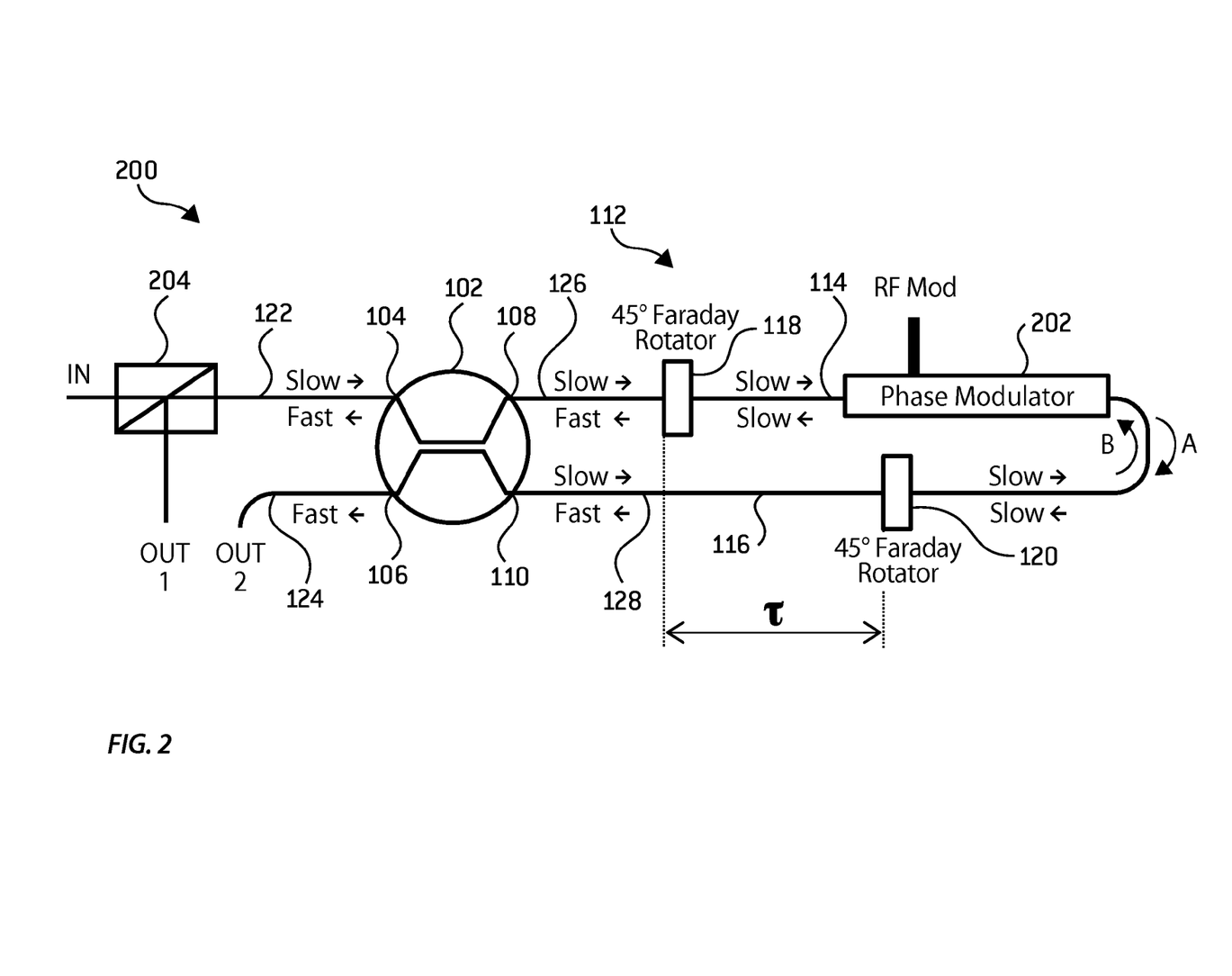
FIG. 2 is a schematic illustrating an unbalanced Mach-Zehnder modulator in accordance with one embodiment which employs a single phase modulator.

FIG. 2 shows an unbalanced Mach-Zehnder modulator 200 in accordance with a further embodiment. Unbalanced Mach-Zehnder modulator 200 is based on Mach-Zehnder interferometer 100 of FIG. 1A and comprises all elements thereof. Like features will therefore not be repeatedly described.

Typically, unbalanced Mach-Zehnder modulators are obtained by disposing a phase modulator along one or both of the optical paths A and B of a conventional two-arm Mach-Zehnder interferometer such as that depicted schematically in FIG. 1B. Similarly, in unbalanced Mach-Zehnder modulator 200 of FIG. 2, a fiber-pigtailed phase modulator 202 is disposed along PMF segment 114 of the Mach-Zehnder interferometer described with reference to FIG. 1A. Because counter-propagating light portions on optical paths A and B propagate along the same polarization axis on PMF segment 114 and thereby in the phase modulator 202, any polarization dependency of the phase modulator 202 will have no practical effect. Accordingly, in one embodiment, the phase modulator 202 is a polarization-selective phase modulator 202, for which the modulation is only efficiently applied to one SOP of the guided light. Furthermore, it should be appreciated that a phase modulator generally comprises a segment of birefringent waveguide that is not an optical fiber. However, since in the case of modulator 200 both light portions propagate concurrently along the same polarization axis through the phase modulator 202, the length and birefringence of this segment of birefringent waveguide also has no practical effect on the differential path length between path A and path B.

The configuration of FIG. 2 also is amenable to the use of a polarized phase modulator as the phase modulator 202. Of course, a polarization-independent phase modulator may also be used but this is not required.

The phase modulator 202 modulates light propagating along optical paths A and B such that the resulting modulation is similar to that of a conventional unbalanced Mach-Zehnder modulator. However, unlike conventional unbalanced Mach-Zehnder modulators, the unbalanced Mach-Zehnder modulator 200 design is suitable for all-fiber construction.

Similarly to Mach-Zehnder interferometer 100, the differential path length $\tau$ of Mach-Zehnder modulator 200 is defined by the birefringence B and the length $\Delta L$ of PMF segment 116 as given hereinabove.

Electro-optic phase modulators are generally optimized for operation with light propagating in a preferential direction. For better modulation efficiency, the electrode that provides modulation by varying the electric field within the "active" optical material (e.g. lithium niobate crystal) is thus usually positioned close to the light input of the active segment of the phase modulator. In this case, if light travels in the opposite direction relative to the preferential direction, it will still be modulated but with reduced modulation efficiency. Such phase modulators are referred to herein as directionally-asymmetric phase modulators. This asymmetric behavior becomes especially significant in the case of high modulation frequencies for which the modulation period is smaller and becomes close to or smaller than the time spent by the propagating light in the active segment of the phase modulator. It is also possible to construct a directionally-symmetric phase modulator by centering the electrode in the active segment (generally equidistant from the two modulator light ports), but such modulators are not presently widely commercialized.

As known in the art, a common phase modulation applied on both arms of a Mach-Zehnder modulator results in a global phase modulation and hence a frequency modulation, termed "chirp". A differential phase modulation (+$\phi$ on one arm and −$\phi$ on the other) results in an amplitude modulation. Accordingly, almost any combination of frequency and amplitude modulation may be achieved by simultaneously applying appropriate electrical control signals to the common and the differential phase modulation.

In the Mach-Zehnder modulator 200 of FIG. 2, the common phase modulation is controlled by the phase modulation as applied on both propagation directions (A and B), which does not need to be directionally symmetric in terms of modulation efficiency. In one embodiment, the common phase modulation is maximized by positioning the phase modulator at the central optical position along the loop 112 (i.e. between ports 108 and 110 of the optical splitter/combiner 102). In this case, the common phase modulation grows with the directional symmetry of the modulation. In another embodiment, total suppression of the common phase modulation, and hence maximization of the differential phase modulation, is achieved by employing a directionally-symmetric phase modulator as the phase modulator 202 and by offsetting its position by a quarter of the modulation period relative to the central optical position on the loop 112. For example, using a 1-GHz modulation frequency, a quarter of the modulation period corresponds to an offset of approximately 5 cm. Using a directionally symmetric phase modulator, different ratios of common and differential phase modulations may be obtained by offsetting the phase modulator 202 relative to the central optical position by any value between zero and a quarter of the modulation period.

For complete adjustment of the ratio between common and differential phase modulations without using a directionally-symmetric phase modulator, an arrangement comprising two directionally-asymmetric phase modulators may be employed, as described hereinafter with reference to FIG. 3.

The phase modulator 202 is controlled as known in the art for the specific application. For example, the frequency of the phase modulation is selected according to the required behavior. It is also noted that, in typical applications, a sinusoidal control signal is used but that other control signals may also be envisaged.

It should also be appreciated that both ports 104 and 106 may be used as output ports of the modulator 200. Accordingly, in this specific embodiment, the Mach-Zehnder modulator 200 additionally comprises extraction optics in the form of a polarization beam splitter 204 coupled to port 104 of the optical splitter/combiner 102 in order to allow extraction of the output signal on both port 104 and port 106 of the optical splitter/combiner 102 while still allowing input optical signal to be received at port 104. Extracted output signal is thus available on two output ports, i.e. OUT1 and OUT2 of the Mach-Zehnder modulator 200, respectively coupled to port 104 and 106. The polarization beam splitter 204 is used to transmit to the optical splitter/combiner 102 the input optical signal guided along one polarization axis, i.e. the slow axis in this case, received at the input port (IN) of the modulator 200 and propagating from left to right in FIG. 2, while extracting the output signal received from port 104 of the optical splitter/combiner 102 to a first input port (OUT1), which is then guided along the other polarization axis, i.e. the fast axis in this case, propagating from right to left in FIG. 2.

Figure 3:
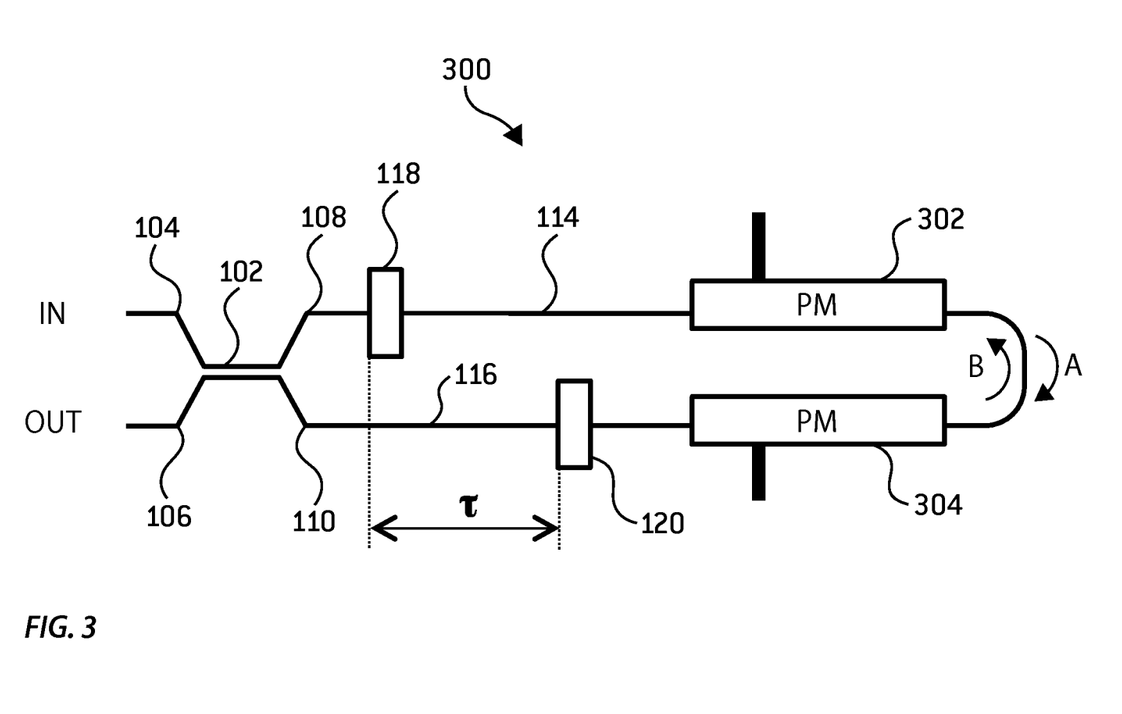
FIG. 3 is a schematic illustrating an unbalanced Mach-Zehnder modulator in accordance with another embodiment which employs a pair of phase modulators.

FIG. 3 shows another embodiment of an unbalanced Mach-Zehnder modulator 300, which may be particularly advantageous when a directionally-symmetric phase modulator 202 is either not available or does not retain its directional symmetry at the modulation frequency of interest. In this embodiment, a pair of phase modulators 302, 304 are disposed in cascade along PMF segment 114. Again, unbalanced Mach-Zehnder modulator 300 is based on the Mach-Zehnder interferometer 100 of FIG. 1A and comprises all elements thereof. Like features will therefore not be repeatedly described. However, in unbalanced Mach-Zehnder modulator 300, substantially identical phase modulators 302 and 304 are disposed in opposing orientations such that their respective directional asymmetry mutually cancels for optical paths A and B, at least to first order. The asymmetry of the phase modulators 302, 304 thereby no longer contributes significantly to the total chirp of the Mach-Zehnder modulator 300. Both the common and the differential phase modulations of the Mach-Zehnder modulator 300 can then be adjusted by appropriately choosing the relative position of the phase modulators 302, 304 on PMF segment 114 and/or by adjusting the common and differential phases of their modulation control signals (e.g. input electrical waveforms).

It should be noted that if the phase modulators 302, 304 are polarization independent, the resulting Mach-Zehnder modulator 300 is also polarization independent, except for Polarization Mode Dispersion (PMD) due to the use of PMFs. This PMD may be compensated by adding an extra segment of PMF, referred to as the "PMD-compensating PMF segment", oriented at 90° relative to the PMF segment 116. Such a PMD-compensating PMF segment may be connected or otherwise mated outside the Mach-Zehnder modulator 300, i.e. coupled to input port 104 or output port 106. It may also be cascaded with PMF 114 within the loop 112, anywhere between non-reciprocal polarization-transforming arrangements 118 and 120.

As with the Mach-Zehnder modulator 200, the phase modulators 302, 304 are controlled as known in the art for the specific application.

It will be understood that modifications may be made to Mach-Zehnder interferometer 100 and Mach-Zehnder modulators 200 and 300. For example, extraction optics may be added adjacent ports 104 and 106 of the optical splitter/combiner 102 in order to provide a dual input and a dual output.

Figure 4:
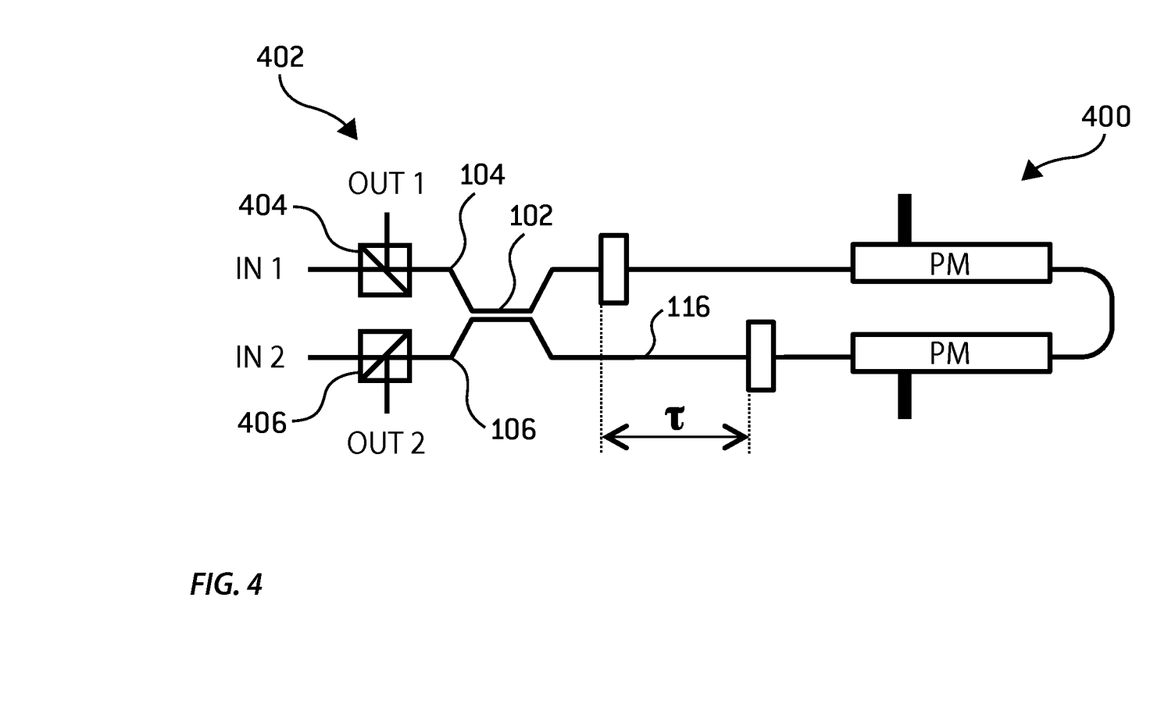
FIG. 4 is a schematic illustrating an unbalanced Mach-Zehnder modulator in accordance with another example embodiment which employs a pair of phase modulators and polarization beam splitters to provide two separate inputs and two separate outputs to the modulator.

FIG. 4 shows an example of an unbalanced Mach-Zehnder modulator 400 having such extraction optics 402. In this embodiment, the extraction optics 402 comprises a polarization beam splitter 404, 406 on each of input ports 104, 106. Input optical signal propagating on one polarization axis passes unchanged through the polarization beam splitter 404 or 406 and then reaches port 104 or 106 of the optical splitter/combiner 102. Two input ports IN1 and IN2 are thereby provided such that either one of the input ports may be used equivalently. Output light returning from the optical splitter/combiner 102 on ports 104 and 106 on the other polarization axis is extracted respectively by polarization beam splitters 404 and 406, to provide outputs OUT1 and OUT2. Such an embodiment may be useful for applications where different input optical signals (e.g. at different wavelengths) need to be modulated with substantially the same amplitude and phase, since only one Mach-Zehnder modulator may be employed.

Figure 5A:
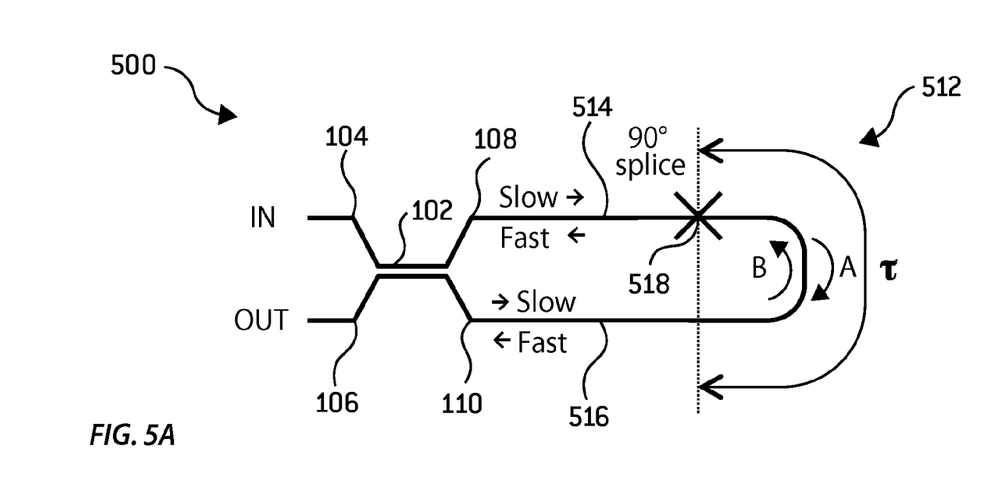
FIG. 5A is a schematic illustrating a Mach-Zehnder interferometer in accordance with another embodiment which does not require the use of non-reciprocal polarization-transforming arrangements.

FIG. 5A shows another embodiment of a Mach-Zehnder interferometer 500. The interferometer 500 comprises an optical splitter/combiner 102, having first and second pigtailed ports 104, 106 on one side thereof, and third and fourth pigtailed ports 108, 110 on the other side thereof. A loop 512 comprising two cascaded PMF segments 514, 516 is connected between third and fourth pigtailed ports 108, 110 of the optical splitter/combiner 102 and an optical arrangement which consists of a 90° fusion splice 518 is inserted between PMF segments 514 and 516. It should be appreciated that fiber pigtails of ports 108 and 110 may respectively provide the PMF segments 514 and 516 by adjusting their respective lengths to the 90° fusion splice 518. The length difference $\Delta L$ between the two fiber pigtails then generates the differential path length $\tau$ of interferometer 500.

As in the interferometer 100 of FIG. 1A, an optical signal received on port 104 of the optical splitter/combiner 102 is split into two approximately equal light portions on ports 108 and 110 such that the two light portions propagate concurrently in mutually opposite directions on the loop 512 of PMFs segments 514, 516, thereby defining two optical paths, i.e. path A from port 108 to 110 and path B from port 110 to 108.

In this configuration, the two light portions counter-propagate along mutually orthogonal polarization axes on both PMF segments 514 and 516. However, at the 90° fusion splice 518, the SOP of light is rotated by 90° between PMF segments 514 and 516 on path A and between PMF segments 516 and 514 on path B. The difference in length $\Delta L$ between PMF segments 512 and 514 and the birefringence of this differential segment defines an effective optical-path length difference between paths A and B which provides the Mach-Zehnder differential path length $\tau$. The differential path length $\tau$ is thereby defined by the birefringence of the PMF segments and the length difference ΔL as follows:

$$\tau = \Delta L \times B \quad (3)$$

where ΔL is the difference in length between PMF segments 514 and 516 and B the birefringence of the PMF segments 514 and 516.

Figure 5B:
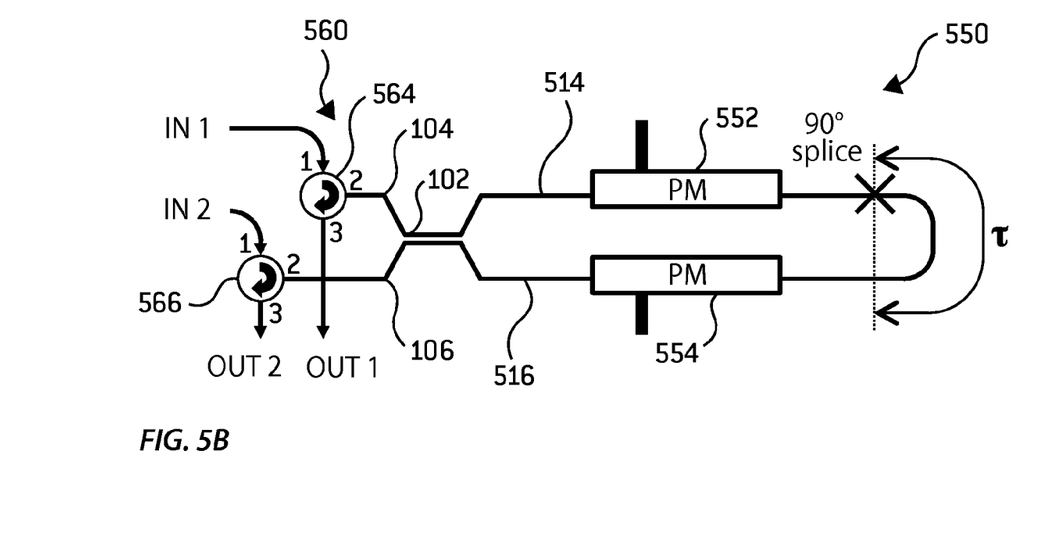
FIG. 5B is a schematic illustrating an unbalanced Mach-Zehnder modulator in accordance with another embodiment based on the interferometer of FIG. 5A.

FIG. 5B shows an example of an unbalanced Mach-Zehnder modulator 550 based on the interferometer 500 of FIG. 5A. Mach-Zehnder modulator 550 comprises all elements of interferometer 500 and like features will therefore not be repeatedly described. To provide an unbalanced Mach-Zehnder modulator 550, at least one fiber-pigtailed phase modulator, and in this case two fiber-pigtailed phase modulators 552 and 554 are inserted within the loop, respectively along PMF segments 514 and 516. The Mach-Zehnder modulator 550 is further illustrated with extraction optics 560 that will be described hereinafter.

Because in this configuration, the phase modulators 552 and 554 are disposed along PMF segments 514 and 516 where the two light portions propagate along mutually orthogonal polarization axes, the phase modulators 552 and 554 should generally be made polarization-independent. In this case, the resulting Mach-Zehnder modulator 550 is also completely polarization independent, except for PMD due to PMF fiber pigtails. As mentioned hereinabove, this PMD may be compensated for by adding a PMD-compensating PMF segment external to the modulator 550. As a result of its polarization independence, the Mach-Zehnder modulator 550 may be used with input signals that are arbitrarily polarized, partially unpolarized or totally unpolarized.

However, it should be appreciated that, for many potential applications, embodiments of the Mach-Zehnder modulator described herein may be employed as elements within larger devices or systems based on a fully polarization-maintaining design. Hence, in such cases the input signal would be fully (typically linearly) polarized, and therefore no PMD-compensating PMF segment would be needed.

In this illustrated embodiment, extraction optics 560 is added next to ports 104 and 106 of the optical splitter/combiner 102 in order to provide a dual input and a dual output to Mach-Zehnder modulator 550. In this embodiment, extraction optics 560 consists of optical circulators 564, 566, respectively adjacent input ports 104, 106. Input optical signal received on port 1 of the optical circulators 564, 566 is circulated (i.e. propagated) to port 2, which is connected to input ports 104, 106 of the optical splitter/combiner 102. Ports 1 of the optical circulators 564, 566 thereby provide respective input ports IN1 and IN2 which may either be used equivalently. Output light returning from the optical splitter/combiner 102 on ports 104 and 106 is received on port 2 of the optical circulators 564, 566 and is circulated to port 3, to provide a dual output, i.e. OUT1 and OUT 2.

The present invention is predicated upon the differential delay τ introduced by the "unbalanced" length of birefringent optical fibers of the optical path, which generally corresponds, in the hereinbefore described embodiments, to PMF segment 116. The magnitude of this differential delay is fixed by the length of PMF segment 116, which is advantageously much greater than that of a free-space or guided-light delay corresponding to the typically few picoseconds to tens of picoseconds of delay that are desired for many applications. Nevertheless, this PMF segment 116, once chosen and spliced into the Mach-Zehnder interferometer or modulator, gives rise to a particular fixed delay. For certain applications, e.g. variable-rate DPSK receivers or transmitters, it may be highly desirable that this differential delay τ be readily adjustable.

To this end, PMF segment 116 in FIGS. 1A, 2, 3 and 4 may be replaced by an adjustable-birefringence waveguide, designs for which have been described in the scientific literature and for which variants thereof may well become commercially available at reasonable cost in the foreseeable future. An example of such a variable waveguide is a microstructure optical fiber into which an index tunable polymer is infused into the pores (cf. C. Kerbage and B. Eggleton, Optics Express, Vol. 10, Issue 5, pp. 246-255 (2002)). By means of an appropriate control parameter of such an adjustable-birefringence waveguide, the differential delay τ of the Mach-Zehnder interferometer or modulator may be selectively chosen.

Of course, one skilled in the art will understand that numerous variations to the herein described embodiments are possible without departing from the scope of the present invention.

For example, although the embodiments described herein employ PMF having linear Principal States of Polarization (PSPs), chiral PMF segments having left- and right-circular PSPs could also be employed. In this case, instead of using Faraday rotators disposed at 45° relative to the polarization axis (i.e. PSPs) of the PMF segments, one would need to employ modified Faraday rotators which, on the Poincaré sphere, generate 90° rotation of the input circular signal along a meridian, and this independently of the propagation direction.

The embodiments described above are intended to be illustrative only. The scope of the invention is therefore intended to be limited solely by the appended claims.

What is claimed is:

1. A method for effecting self-interference of an optical signal, the method comprising:
    splitting said optical signal into a first and a second light portion;
    coupling said first and second light portions to a loop comprising a plurality of segments of polarization-maintaining fiber such that said first and second light portions propagate concurrently in mutually opposite directions in said loop;
    oppositely propagating said first and said second light portions along respective mutually orthogonal polarization axes on at least a first of said segments of polarization-maintaining fiber of said loop, such that birefringence of said at least a first of said segments where the light portions propagate on mutually orthogonal polarization axes provides a differential path length;
    on a second of said segments of polarization-maintaining fiber of said loop, propagating said first and second light portions along a same polarization axis; and
    interfering together the propagated light portions to provide a Mach-Zehnder interferometer having said differential path length.

2. The method as claimed in claim 1, further comprising: phase modulating said first and said second light portions along the second segment such that said interferometer provides a Mach-Zehnder modulator having said differential path length.

3. A Mach-Zehnder interferometer comprising:
    an optical splitter/combiner for receiving an input optical signal on an input port of said optical splitter/combiner and splitting said optical signal into a first and a second light portion on respective first and second ports of said optical splitter/combiner and recombining, on an output port of said optical splitter/combiner, said first and second light portions returning to said optical splitter/combiner on said first and second ports to mutually interfere;

a loop comprising at least a first and a second cascaded segments of polarization-maintaining fibers in the optical path between said first and second ports of said optical splitter/combiner such that said first and second light portions propagate concurrently in mutually opposite directions in said loop; and a first optical arrangement between the first segment and the second segment of said loop for rearranging the axes of propagation of said first and second light portions such that, on at least said first segment, said first and second light portions propagate along respective mutually orthogonal polarization axes of the polarization-maintaining fiber, whereby birefringence of said at least said first segment where the light portions propagate on mutually orthogonal polarization axes provides a differential path length of said interferometer;

wherein said first optical arrangement is a first non-reciprocal polarization-transforming arrangement, and wherein said interferometer further comprises a second non-reciprocal polarization-transforming arrangement disposed along said loop such that, on said second segment, said first and second light portions propagate along a same polarization axis of the polarization-maintaining fiber.

4. The interferometer as claimed in claim 3, wherein said second non-reciprocal polarization-transforming arrangement is disposed along the light path between said first port and said second segment of said loop such that said first light portion is coupled from said first port to said second segment with maintained alignment of its state of polarization with respect to the polarization axis of said second segment whereas said second light portion is coupled from said second segment to said first port with an orthogonal alignment of its state of polarization with respect to the polarization axis of said first port; and wherein said first non-reciprocal polarization-transforming arrangement is disposed along the light path between said first segment and said second segment of said loop such that said first light portion is coupled from said second segment to said first segment with an orthogonal alignment of its state of polarization with respect to the polarization axis of said first segment whereas said second light portion is coupled from said first segment to said second segment with maintained alignment of its state of polarization with respect to the polarization axis of said second segment.

5. The interferometer as claimed in claim 3, further comprising at least one phase modulator disposed along said second segment of said loop for modulating said first and said second light portions such that said interferometer provides a Mach-Zehnder modulator having said differential path length.

6. The Mach-Zehnder modulator as claimed in claim 5, wherein said phase modulator is a polarization-dependent phase modulator, said first and second light portions also propagating along a same polarization axis on said phase modulator.

7. The Mach-Zehnder modulator as claimed in 5, wherein said at least one phase modulator is a directionally-symmetric phase modulator positioned along said second segment such that a chirp of the Mach-Zehnder modulator is suppressed.

8. The Mach-Zehnder modulator as claimed in claim 5, comprising two directionally-asymmetric phase modulators disposed along said second segment of said loop in opposing orientations such that their respective asymmetry cancels.

9. The Mach-Zehnder modulator as claimed in claim 8, wherein said two phase modulators are polarization-independent phase modulators and said Mach-Zehnder modulator is thereby a polarization-independent Mach-Zehnder modulator.

10. The Mach-Zehnder modulator as claimed in claim 8, further comprising a compensating fiber segment made of a polarization-maintaining fiber and coupled to one of said input port and said output port of said optical splitter/combiner for compensating a Polarization Mode Dispersion (PMD) of said Mach-Zehnder modulator.

11. A method for effecting self-interference of an optical signal in a Mach-Zehnder interferometer, the method comprising:

splitting said optical signal into a first and a second light portion, using an optical splitter/combiner;

coupling said first and second light portions to a fiber-optic loop comprising at least a first and a second cascaded segments of polarization-maintaining fiber such that said first and second light portions propagate concurrently in mutually opposite directions in said loop;

rearranging the axes of propagation of said first and second light portions between the first segment and the second segment of polarization-maintaining fiber of said loop using a first optical arrangement such that said first and second light portions propagate along respective mutually orthogonal polarization axes on at least said first segment, whereby birefringence of said at least said first segment where the light portions propagate on mutually orthogonal polarization axes provides a differential path length; and interfering together the propagated light portions using said optical splitter/combiner to provide a Mach-Zehnder interferometer having said differential path length;

wherein the axes of propagation of said first and second light portions are rearranged between said first and said second segment using a non-reciprocal polarization-transforming arrangement such that they propagate along a same polarization axis on said second segment of polarization-maintaining fiber of said loop.

12. The method as claimed in claim 11, further comprising: phase modulating said first and second light portions along said second segment of said loop using a phase modulator to provide a Mach-Zehnder modulator having said differential path length.

13. The method as claimed in claim 12, wherein the axes of propagation of said first and second light portions are rearranged between said first and said second segment using a non-reciprocal polarization-transforming arrangement such that they propagate along a same polarization axis on said second segment of polarization-maintaining fiber and said phase modulator.

* * * * *